(12) United States Patent
Tian et al.

(10) Patent No.: US 11,033,931 B2
(45) Date of Patent: Jun. 15, 2021

(54) WOOD SUBSTRATE INCLUDING AN ABRASION RESISTANT COATING

(71) Applicant: AHF LLC, Mountville, PA (US)

(72) Inventors: Dong Tian, Lancaster, PA (US); Daniel P. Baker, Downingtown, PA (US); Burton L. Wilson, Pine Knot, NY (US)

(73) Assignee: AHF, LLC, Mountville, PA (US)

( * ) Notice: Subject to any disclaimer, the term of this patent is extended or adjusted under 35 U.S.C. 154(b) by 3 days.

(21) Appl. No.: 16/340,056

(22) PCT Filed: Oct. 4, 2017

(86) PCT No.: PCT/US2017/055068
§ 371 (c)(1),
(2) Date: Apr. 5, 2019

(87) PCT Pub. No.: WO2018/067655
PCT Pub. Date: Apr. 12, 2018

(65) Prior Publication Data
US 2020/0055084 A1   Feb. 20, 2020

Related U.S. Application Data

(60) Provisional application No. 62/404,413, filed on Oct. 5, 2016.

(51) Int. Cl.
*B05D 7/06* (2006.01)
*B05D 7/00* (2006.01)
*C09D 5/00* (2006.01)
*C09D 133/08* (2006.01)

(52) U.S. Cl.
CPC ............. *B05D 7/06* (2013.01); *B05D 7/58* (2013.01); *C09D 5/00* (2013.01); *C09D 133/08* (2013.01)

(58) Field of Classification Search
None
See application file for complete search history.

(56) References Cited

U.S. PATENT DOCUMENTS

| | | | |
|---|---|---|---|
| 5,928,778 A | 7/1999 | Takahashi et al. | |
| 6,218,001 B1 | 4/2001 | Chen et al. | |
| 2001/0051229 A1* | 12/2001 | Witt | C09D 4/06 427/508 |
| 2008/0063844 A1 | 3/2008 | Chen et al. | |
| 2009/0269500 A1* | 10/2009 | Pastrana | B05D 7/06 427/325 |
| 2014/0212597 A1* | 7/2014 | Posey | C09D 7/61 427/558 |

FOREIGN PATENT DOCUMENTS

EP   1918336 A1   5/2008

* cited by examiner

*Primary Examiner* — Chinessa T. Golden
(74) *Attorney, Agent, or Firm* — Budzyn IP Law, LLC (57) ABSTRACT

An abrasion resistant coating is disclosed. The coating includes diamond particles and may be used in one or more coating layers of a coating stack for a wood substrate. Wood substrates include hardwood and engineered hardwood flooring.

10 Claims, 9 Drawing Sheets

WOOD SUBSTRATE INCLUDING AN ABRASION RESISTANT COATING

CROSS-REFERENCE TO RELATED APPLICATIONS

This application claims the benefit of U.S. Provisional Application No. 62/404,413, filed Oct. 5, 2017, the contents of which are incorporated herein by reference.

BACKGROUND OF THE INVENTION

Field of the Invention

An abrasion resistant coating is disclosed. The coating includes diamond particles and may be used in one or more coating layers of a coating stack for a wood substrate. Wood substrates include hardwood and engineered hardwood flooring.

Summary of Related Art

Typically high abrasion sealers (HAS) are located adjacent to either the stain layer or to filler layers within a coating stack One or more HASs may be employed, resulting in enhancement of a particular test result, known as the Taber abrasion test. Products without HAS typically have a final Taber abrasion result of 50 cycles or less using an S42 wheel Enhanced performance finishes typically have Taber Abrasion vales of about 500 cycles. Finish systems with higher aluminum oxide content, higher particle size, thicker HAS layer gauges, or multiple HAS layers are sometimes referred to a "Commercial Grade" finishes and can achieve more than 1000 cycles in a Taber Abrasion test. Examples of such finish systems are those used by Armstrong Flooring in product branded "Lifetime" finish, or on the Engineered Wood Products marketed under the sub-brand "Performance Plus". Some finishes systems, such as those sold under the brand Mohawk Armormax, claim Ultrahigh Taber Abrasion, and achieve performance levels of about 3000 cycles. However, in the case of the Armormax finish, the haze of the finish system increased, as did the surface texture. The end product has an appearance of a low clarity, which detracts from the natural beauty of the wood color and pattern. Furthermore, products including the enhanced Taber Abrasion, Commercial Grade, and Ultrahigh performance finishes typically do not provide enhanced resistance to small scratches.

SUMMARY OF THE INVENTION

No currently available finish system includes the combination of Commercial Grade Taber abrasion, very good stain and chemical resistance, industry standard static COF, and a high degree of color stability and image clarity as that provided by the present invention.

Suitable abrasion resistant coatings that include diamond particles and optionally other abrasion resistant particles are disclosed in U.S. patent application Ser. Nos. 14/678,163 and 14/678,183, which are herein incorporated by reference in their entirety.

The abrasion resistant coatings extend the time during which a flooring product retains its original appearance by reducing the frequency of formation of fine scratches that cause loss of gloss. Other positive visual and performance attributes of the wood floor are maintained, which minimize other negative visual or performance attributes. Positive visual attributes include finish clarity, image resolution, color, gloss level, and surface texture. Positive performance attributes include stain and scuff resistance, gloss retention, scratch resistance, solvent resistance, and abrasion resistance. Negative visual attributes include haziness, milky appearance, "ropey" or "grapevine" finish defects, and color shifts on exposure to daylight or interior lighting. Negative performance attributes include peeling of finish, cracking of finish after exposure to extremes of temperature and humidity, spalling of finish from the surface, or excessive cracking on impact from common objects, or static coefficient of friction values below specified industry norms. Also included is a method to precisely apply a finish system that maximizes the desired visual and performance advantages in a way that minimizes waste during the manufacturing process by controlling application rate and curing/drying of each component within a predefined process window.

The abrasion resistant particles contribute to the abrasion resistance of the coating stack when included in any layer of the coating stack. For example, they may be included in the topcoat or the high abrasion sealer layer.

DETAILED DESCRIPTION OF THE INVENTION

The abrasion resistant coating stack may be applied to a wood substrate. Suitable wood substrates include solid hardwood and engineered hardwood, such as that used for flooring. The coating stack includes several layers selected from the group consisting of a primer layer; one or more stain layers; one or more filler layers; one or more high abrasion sealer layers; anti-check primer layer; one or more sanding sealer layers; one or more topcoat layers; and combinations thereof, wherein one or more of said layers includes abrasion resistant particles comprising diamond particles. The order of the layers, above, is typically how they are included in a coating stack.

The primer layer is typically used when applying finishes to exotic tropical woods that have large amounts of oil. When a primer or anti-check primer is included, the product is softly sanded, since priming usually raises grain of the wood. The anti-check primer, if applied, may also be included after the high abrasion sealer layer.

One or more stain layers may be included, such as a 100% solids UV curable stain, a water based UV curable stain, or a solvent based UV curable stain. A second stain layer, if included, may typically be a 100% solids UV curable stain, a water based UV curable stain, or a solvent based UV curable stain. A second stain may be especially useful if a dark color is required, or if intermediate steps are taken after a first stain, such as scratching, hammering, staining, sanding, etc., as may be desired in order to create "weathered" or antiqued or other specialty visuals that require one or more stain layers, potentially of different colors.

One or more filler layers may be applied with a coater known as a reverse fill machine. This coater pushes, via rollers, a viscous 100% solid UV curable into the "open" pores on the surface of the wood The one or more high abrasion sealer layers (HAS) are similar to the sanding sealers, but typically include aluminum oxide. In some embodiments, diamond particles may be used in addition to or in place of aluminum oxide. Other abrasion resistant particles may also be included. HAS layers provide increased performance in the Taber Abrasion Test. Typically thicker HAS and larger particle size means better performance (higher number of "Cycles" to failure).

An optional Anti-Check Primer layer is most commonly used for flat products that are at higher risk of having checking problems, such as oak and hickory One more sanding sealer layers may be included. Typically they include a filler such as talc for a low cost, 100% solids layer that is used to smooth the surface of the coating stack beneath, and which is then used as a "base" for the final topcoats. Multiple sanding sealer layers may be needed to provide a smooth surface.

One or more topcoat layers may be included to provide gloss and abrasion and/or scratch resistance to the outermost layer of the substrate. This may be a "Wet-on-wet" (WOW) topcoat, which can include abrasion resistant particles such as diamond. Additional layers may add thickness to the layer, while the wiping action of the applicator helps assure smoothness of the finish.

Many examples of suitable coating layers are commercially available and well-known in the art. Examples of suppliers that provide suitable compositions include PPG Industries, Sherwin Williams, Akzo Nobel, and Valspar, among others. The abrasion resistant particles may be added to any of these compositions.

In some embodiments are a substrate and an abrasion resistant coating layer. The abrasion resistant coating layer may include coating matrix and abrasion resistant particles. The coating matrix may be a curable coating composition comprising a binder and other additives, such as photoinitiators described below. According to some embodiments, the binder may include acrylate-functional compounds and the abrasion resistant particles comprise a mixture of diamond particles (of micron and/or nano-size) and second abrasion resistant particles.

The binder may include resin selected from acrylate-functional polymer, acrylate-functional oligomer, acrylate-functional monomer, and combinations thereof. The acrylate-functional polymer may include polyester acrylate, polyurethane acrylate, polyether acrylate, polysiloxane acrylate, polyolefin acrylate, and combinations thereof.

A suitable polyester acrylate may be a linear or branched polymer having at least one acrylate or (meth)acrylate functional group. In some embodiments, the polyester acrylate has at least 1 to 10 free acrylate groups, (meth)acrylate groups, or a combination thereof.

The polyester acrylate may have an acrylate functionality The polyester acrylate may be the reaction product of polyester polyol and an carboxylic acid functional acrylate compound such as acrylic acid, (meth)acrylic acid, or a combination thereof at a OH:COOH ratio of about 1:1. The polyester polyol may be a polyester diol having two hydroxyl groups present at terminal end of the polyester chain. In some embodiments, the polyester polyol may have a hydroxyl functionality ranging from 3 to 9, wherein the free hydroxyl groups are present at the terminal ends of the polyester chain or along the backbone of the polyester chain.

In non-limiting embodiments, the polyester polyol may be the reaction product of a hydroxyl-functional compound and a carboxylic acid functional compound. The hydroxyl-functional compound is present in a stoichiometric excess to the carboxylic-acid compound. In some embodiments the hydroxyl-functional compound is a polyol, such a diol or a tri-functional or higher polyol (e.g. triol, tetrol, etc.). In some embodiments the polyol may be aromatic, cycloaliphatic, aliphatic, or a combination thereof. In some embodiments the carboxylic acid-functional compound is dicarboxylic acid, a polycarboxylic acid, or a combination thereof. In some embodiments, the dicarboxylic acid and polycarboxylic acid may be aliphatic, cycloaliphatic, aromatic.

A diol may be selected from alkylene glycols, such as ethylene glycol, propylene glycol, diethylene glycol, dipropylene glycol, triethylene glycol, tripropylene glycol, hexylene glycol, polyethylene glycol, polypropylene glycol and neopentyl glycol; hydrogenated bisphenol A; cyclohexanediol; propanediols including 1,2-propanediol, 1,3-propanediol, butyl ethyl propanediol, 2-methyl-1,3-propanediol, and 2-ethyl-2-butyl-1,3-propanediol; butanediols including 1,4-butanediol, 1,3-butanediol, and 2-ethyl-1,4-butanediol; pentanediols including trimethyl pentanediol and 2-methylpentanediol; cyclohexanedimethanol; hexanediols including 1,6-hexanediol; caprolactonediol (for example, the reaction product of epsilon-caprolactone and ethylene glycol); hydroxy-alkylated bisphenols; polyether glycols, for example, poly(oxytetramethylene) glycol. In some embodiments, the tri-functional or higher polyol may be selected from trimethylol propane, pentaerythritol, di-pentaerythritol, trimethylol ethane, trimethylol butane, dimethylol cyclohexane, glycerol and the like.

In some embodiments the dicarboxylic acid may be selected from adipic acid, azelaic acid, sebacic acid, succinic acid, glutaric acid, decanoic diacid, dodecanoic diacid, phthalic acid, isophthalic acid, 5-tert-butylisophthalic acid, tetrahydrophthalic acid, terephthalic acid, hexahydrophthalic acid, methylhexahydrophthalic acid, dimethyl terephthalate, 2,5-furandicarboxylic acid, 2,3-furandicarboxylic acid, 2,4-furandicarboxylic acid, 3,4-furandicarboxylic acid, 2,3,5-furantricarboxylic acid, 2,3,4,5-furantetracarboxylic acid, cyclohexane dicarboxylic acid, chlorendic anhydride, 1,3-cyclohexane dicarboxylic acid, 1,4-cyclohexane dicarboxylic acid, and anhydrides thereof, and mixtures thereof. In some embodiments the polycarboxylic acid may be selected from trimellitic acid and anhydrides thereof.

In some embodiments, the acrylate-functional polyurethane may be a linear or branched polymer having at least one functional group selected from an acrylate group or a (meth)acrylate group. In some embodiments, the acrylate-functional polyurethane may have at least 2 to 9 functional groups selected from an acrylate group, a (meth)acrylate group, or a combination thereof. In some embodiments, the acrylate-functional polyurethane has between 2 and 4 functional groups selected from an acrylate group, (meth)acrylate group, or a combination thereof.

In some embodiments, the acrylate functional polyurethane may be the reaction product of a high molecular weight polyol and diisocyanate, polyisocyanate, or a combination thereof. The high molecular weight polyol may be selected from polyester polyol, polyether polyol, polyolefin polyol, and a combination thereof—the high molecular weight polyol having a hydroxyl functionality ranging from 3 to 9.

In some embodiments, the polyester polyol used to create the acrylate-functional polyurethane is the same as used to create the acrylate functional polyester. In some embodiments, the polyether polyol may be selected from polyethylene oxide, polypropylene oxide, polytetrahydrofuran, and mixtures and copolymers thereof.

A high molecular weight polyol may be reacted with polyisocyanate, such as a diisocyanate, a tri-functional isocyanate (e.g. isocyanurate), higher functional polyisocyanates, or a combination thereof in an NCO:OH ratio ranging from about 2:1 to 4:1. The polyisocyanate may be selected from isophorone diisocyanate, 4,4'-dicyclohexylmethane-diisocyanate, and trimethyl-hexamethylene-diisocyanate, 1,6 hexamethylene diisocyanate, 2,2,4-trimethylhexamethylene diisocyanate, octadecylene diisocyanate and 1,4 cyclohexylene diisocyanate. toluene diisocyanate; methylenediphenyl diisocyanate; tetra methylxylene diisocyanate, and isocyanurates, biurets, allophanates thereof, as well as mixtures thereof. The resulting reaction product is an isocyanate-terminated prepolymer.

The isocyanate-terminated prepolymer is then reacted with hydroxyl-functional acrylate compound in an NCO:OH ratio of about 1:1 to yield an acrylate or (meth)acrylate functional polyurethane. The hydroxyl-functional acrylate compounds may include hydroxyethyl acrylate, hydroxyethyl methacrylate, hydroxypropyl acrylate, hydroxypropyl methacrylate, hydroxybutyl acrylate, hydroxybutyl methacrylate, hydroxypentyl acrylate, hydroxypentyl methacrylate, hydroxyhexyl acrylate, hydroxyhexyl methacrylate, aminoethyl acrylate, and aminoethyl methacrylate, and a combination thereof.

According to some embodiments, the binder may include acrylate-functional oligomers that include mono-functional oligomers, di-functional oligomers, tri-functional oligomers, tetra-functional oligomers, penta-functional oligomers, and combinations thereof.

Mono-functional oligomers may be selected from alkoxylated tetrahydrofurfuryl acrylate; alkoxylated tetrahydrofurfuryl methylacrylate; alkoxylated tetrahydrofurfuryl ethylacrylate; alkoxylated phenol acrylate; alkoxylated phenol methylacrylate; alkoxylated phenol ethylacrylate; alkoxylated nonylphenol acrylate; alkoxylated nonylphenol methylacrylate; alkoxylated nonylphenol ethylacrylate, and mixtures thereof. The alkoxylation may be performed using ethylene oxide, propylene oxide, butylene oxide, or mixtures thereof. In some embodiments the degree of alkoxylation ranges from about 2 to 10. In some embodiments, the degree of alkoxylation ranges from about 4 to 6.

The di-functional oligomers may be selected from ethylene glycol diacrylate, propylene glycol diacrylate, diethylene glycol diacrylate, dipropylene glycol diacrylate, triethylene glycol diacrylate, tripropylene glycol diacrylate, polyethylene glycol diacrylate, polypropylene glycol diacrylate, ethoxylated bisphenol A diacrylate, bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexane dimethanol diacrylate, ethoxylated neopentyl glycol diacrylate, propoxylated neopentyl glycol diacrylate, ethoxylated cyclohexanedimethanol diacrylate, propoxylated cyclohexanedimethanol diacrylate, and mixtures thereof.

Tri-functional oligomers may be selected from trimethylol propane triacrylate, isocyanurate triacrylate, glycerol triacrylate, ethoxylated trimethylolpropane triacrylate, propoxylated trimethylolpropane triacrylate, tris (2-hydroxyethyl) isocyanurate triacrylate, ethoxylated glycerol triacrylate, propoxylated glycerol triacrylate, pentaerythritol triacrylate, melamine triacrylates, and mixtures thereof.

An acrylate-functional monomer may be selected from acrylic acid, methacrylic acid, ethyl acrylic acid, 2-phenoxyethyl acrylate; 2-phenoxyethyl methylacrylate; 2-phenoxyethyl ethylacrylate; tridecryl acrylate; tridecryl methylacrylate; tridecryl ethylacrylate; and mixtures thereof.

Some embodiments may further include acrylate functional monomers selected from alkyl acrylates having up to about 12 carbon atoms in the alkyl segment such as ethyl acrylate, butyl acrylate, 2-ethylhexyl acrylate, amyl acrylate, n-lauryl acrylate, nonyl acrylate, n-octyl acrylate, isooctyl acrylate, isodecyl acrylate, etc.; alkoxyalkyl acrylates such as methoxybutyl acrylate, ethoxyethyl acrylate, ethoxypropyl acrylate, etc.; hydroxyalkyl acrylates such as hydroxyethyl acrylate, hydroxybutyl acrylate, etc.; alkenyl acrylates such as trimethoxyallyloxymethyl acrylate, allyl acrylate, etc.; aralkyl acrylates such as phenoxyethyl acrylate, benzyl acrylate, etc.; cycloalkyl acrylates such as cyclohexyl acrylate, cyclopentyl acrylate, isobornyl acrylate, etc.; aminoalkyl acrylates such as diethylaminoethyl acrylate; cyanoalkyl acrylates such as cyanoethyl acrylate, cyanopropyl acrylate, etc.; carbamoyloxy alkyl acrylates such as 2-carbamoyloxyethyl acrylate, 2-carbamoyl-oxypropyl acrylate, N-methylcarbamoyloxyethyl acrylate, N-ethylcarbamoyloxymethyl acrylate, 2-(N-methylcarbamoyloxy)-ethyl acrylate, 2-(N-ethylcarbamoyloxy)ethyl acrylate, etc.; and the corresponding methacrylates. In some embodiments, the alkyl acrylates having up to about 12 carbon atoms in the alkyl segment may be used as a reactive solvent/diluent in the abrasions resistant coating layer.

The acrylate-functional monomers may include the binder may comprise resin selected from acrylate-functional polymer, acrylate-functional oligomer, acrylate-functional monomer, and combinations thereof.

In some non-limiting embodiments, the acrylate-functional monomer may be selected from acrylic acid, methacrylic acid, ethyl acrylic acid, 2-phenoxyethyl acrylate; 2-phenoxyethyl methylacrylate; 2-phenoxyethyl ethylacrylate; tridecryl acrylate; tridecryl methylacrylate; tridecryl ethylacrylate; and mixtures thereof.

In some embodiments, the acrylate-functional monomer or oligomer is a silicone acrylate. Curable silicone acrylates are known and suitable silicone acrylates are disclosed, for example in U.S. Pat. Nos. 4,528,081 and 4,348,454, herein incorporated by reference. Suitable silicone acrylates include silicone acrylates having mono-, di-, and tri-acrylate moieties. Suitable silicone acrylates include, for example, Silcolease® UV RCA 170 and UV Poly 110, available from Blue Star Co. Ltd, China; and Silmer ACR D2, Silmer ACR Di-10, Silmer ACR Di-50 and Silmer ACR Di-100, available from Siltech.

The coating matrix may further include photoinitiator to facilitate UV curing of the curable coating composition. In some non-limiting embodiments, the photoinitiators may include a benzoin compound, an acetophenone compound, an acylphosphine oxide compound, a titanocene compound, a thioxanthone compound or a peroxide compound, or a photosensitizer such as an amine or a quinone. Specific examples photoinitiatiors include 1-hydroxycyclohexyl phenyl ketone, benzoin, benzoin methyl ether, benzoin ethyl ether, benzoin isopropyl ether, benzyl diphenyl sulfide, tetramethylthiuram monosulfide, azobisisobutyronitrile, dibenzyl, diacetyl and beta-chloroanthraquinone. In some embodiments, the photoinitators are water soluble alkylphenone photoinitiators.

The coating matrix may further include an amine synergist. In some embodiments, the amine synergist may include diethylaminoethyle methacrylate, dimethylaminoethyl methacrylate, N—N-bis(2-hydroxyethyl)-P-toluidine, Ethyl-4-dimethylamino benzoate, 2-Ethylhexyl 4-dimethylamino benzoate, as well as commercially available amine synergist, including Sartomer CN 371, CN373, CN383, CN384 and CN386; Allnex Ebecry P104 and Ebecry P115. The amine synergist may be present in the radiation curable coating composition by an amount ranging from about 1 wt. % to about 5 wt. %, preferably about 3 wt. %

The layer which includes abrasion resistant particles that help impart wear and scratch resistance to the overall coating stack. The improved wear and scratch resistance extends the life span of the floor covering. Examples of the abrasion resistant particles include a combination of abrasion resistant particles, each exhibiting a Mohs hardness value ranging from 6 to 10—including all integers therebetween, as measured on the Mohs scale of mineral hardness. In some embodiments, the abrasion resistant particles may be selected from diamond (Mohs value of 10), aluminum oxide (Mohs value of 9), topaz (Mohs value of 8), quartz (Mohs value of 7), nepheline syenite or feldspar (Mohs value of 6), ceramic or ceramic microspheres (Mohs value of 6), and combinations thereof. The abrasion resistant particle may be a combination of a first abrasion resistant particle consisting of diamond particles and a second abrasion resistant particle having a Mohs value of less than 10. In some embodiments, the coating layer of the present invention may comprise an amount of abrasion resistant particle ranging from about 6 wt. % to about 25 wt. % based on the total weight of the coating layer. In some embodiments, the coating layer of the present invention may comprise an amount of abrasion resistant particle ranging from about 6 wt. % to about 12 wt. % based on the total weight of the coating layer.

According to some embodiments, the second abrasion resistant particle may be present relative to the diamond particle in any suitable weight rating. For example, the weight ratio ranging from about 1:1 to about 10:1. In some non-limiting embodiments, the second abrasion resistant particle is present relative to the diamond particle in a weight ratio of about 1:1. In some non-limiting embodiments, the second abrasion resistant particle is present relative to the diamond particle in a weight ratio of about 2:1. In some non-limiting embodiments, the second abrasion resistant particle is present relative to the diamond particle in a weight ratio of about 4:1. In some non-limiting embodiments, the second abrasion resistant particle is present relative to the diamond particle in a weight ratio of about 8:1. It has been found that coating layers comprising a mixture of diamond particles and second abrasion resistant particle of the present invention (e.g., aluminum oxide particles) exhibits similar abrasion resistance at much lower overall loading levels of abrasion resistant particles compared to coating layers comprising abrasion resistant particles of only aluminum oxide.

According to some embodiments, the abrasion resistant particle is a combination of diamond particle and aluminum oxide particles. According to some embodiments, the aluminum oxide particles may have a variety of particle sizes including a mixture of different sized diamond particles. In some non-limiting embodiments, the aluminum oxide particles of the present invention may have an average particle size that is selected from the range of about 2 μm to about 30 μm. In some non-limiting embodiments, the diamond particles of the present invention may have an average particle size that is selected from range of about 2 μm about 100 μm, such as about 5 μm about 50 μm.

In some embodiments, the abrasion resistant particle is a combination of diamond particle and feldspar particles. The feldspar particle may be present relative to the diamond particle in a weight ratio ranging from about 2:1 to about 5:1. In some non-limiting embodiments, the feldspar particle is present relative to the diamond particle in a weight ratio of about 4:1. In some non-limiting embodiments, the feldspar particle is present relative to the diamond particle in a weight ratio of about 2:1. In some non-limiting embodiments, the feldspar particles of the present invention may have an average particle size that is selected from the range of about 2 μm to about 30 μm—including all integers therebetween. It has been found that coating layers comprising a mixture of diamond particles and feldspar particles may exhibit similar abrasion resistance at much lower overall loading levels of abrasion resistant particles compared to coating layers comprising abrasion resistant particles of only feldspar.

According to some embodiments, the diamond particles selected for the coating layer may have a variety of particle sizes including a mixture of different sized diamond particles. However, according to some embodiments, the diamond particles have a narrow size distribution. According to this invention, the term narrow size distribution means a standard deviation that is no more than 35%, preferably less than 35%, of the average particle size for a given diamond particle blend or mixture. In some embodiments, the standard deviation is less than 25% based on the average particle size for a given diamond particle blend or mixture. In some embodiments, the standard deviation is less than 15% based on the average particle size for a given diamond particle blend or mixture.

In some non-limiting embodiments, the micron sized diamond particles of the present invention may have an average particle size that is selected from the range of about 2 μm to about 50 μm, preferably about 4 μm to 35 μm. In some non-limiting embodiments, the diamond particles of the present invention may have an average particle size that is selected from range of about 6 μm about 25 μm.

In some non-limiting embodiments of the present invention, the diamond particles may be a first mixture of diamond particles that has particle sizes ranging from about 6 μm to about 11 μm, preferably from about 6 μm to about 10 μm—including all integers therebetween and mixtures thereof. According to some embodiments, the first mixture of diamond particles may include diamond particles having an average particle size of about 6 μm, about 7 μm, about 8 μm, about 9 μm, about 10 μm, or 11 μm.

Wherein the average particle size is represented at the 50% distribution point (i.e. about 8 μm) and the standard deviation is about 1.7, making the standard deviation about 21% of the average particle size.

It is possible that the first mixture may contain diamond particle having particle sizes outside of the about 6 μm to about 10 μm range so long as the standard deviation for the first mixture is not greater than 35%, preferably less than 35%. In some embodiments, it is possible that the first mixture may contain diamond particle having particle sizes outside of the about 6 μm to about 10 μm range so long as the standard deviation for the first mixture is less than 25%, preferably less than 15%. In some embodiments, the first mixture may contain up to 4 wt. % of diamond particles having a particle size that is less than 6 μm. In some non-limiting embodiments, the first mixture may contain up to 4 wt. % of diamond particles having a particle size that is less than 6 μm. In some embodiments, the first mixture may contain up to 6.54 wt. % of diamond particles having a particle size that is greater than 11 μm.

In some non-limiting embodiments of the present invention, the diamond particles may be a second mixture of diamond particles that has particle sizes ranging from about 15 μm to about 30 μm, preferably about 15 μm to about 25 μm—including all integers therebetween and mixtures thereof. According to some embodiments, the second mixture of diamond particles may have an average particle size of about 15 μm, about 16 μm, about 17 μm, about 18 μm, about 19 μm, about 20 μm, about 21 μm, about 22 μm, about 23 μm, about 24 μm, or about 25 μm.

Alternatively, nano particles of diamond may also be included. Suitable nano particles of diamond have a particle size of about 10 nm to about 500 nm. The nano particle diamond may be included in place of micron sized diamonds or in addition to the micron sized diamond particles The coating layer including the abrasion resistant particles may include the first abrasion resistant diamond particles in amount that ranges from about 1 wt. % to about 5 wt. %, a based on the total weight of the coating layer, preferably 2 wt. % to 4 wt. %. In some embodiments, the coating layer may comprise about 1.75 wt. % to about 3.7 wt. % of diamond particles. It has been discovered that the coating layer of the present invention may exhibit the desired scratch resistance and gloss retention properties when using abrasion resistant particles that consist of only diamond particles in the above recited amounts. It has also been found that exceeding diamond particle loading amounts of 5.5 wt. %, there may be an undesirable effect to the visual properties of the coating layer.

The average coating matrix thickness is the vertical distance measure between the top surface and bottom surface of the coating matrix. According to some embodiments, the average matrix coating thickness TCM may range from about 4 μm to about 40 μm—including all integers therebetween. According to some embodiments, the average matrix coating thickness TCM may range from about 6 μm to about 20 μm—including all integers therebetween. According to some embodiments, the average matrix coating thickness TCM is 6 μm. According to some embodiments, the average matrix coating thickness TCM is 18 μm.

According to some embodiments of the present invention, the dimensions of the diamond particles and the coating matrix may be selected such that a ratio of the average coating matrix thickness TCM to average particle size DAP of the diamond particles 20 (the TD ratio) ranges from about 0.6:1 to about 2:1. In some embodiments, the TD ratio of the average matrix coating thickness TCM to the average particle size DAP of the diamond particles 20 ranges from about 0.9:1 to 2:1.

In some embodiments of the present invention, the average particle size DAP of the diamond particles 20 and the average coating matrix thickness TCM may be outside of the previously discussed size ranges so long as, together, the average coating matrix thickness TCM and the average particle size DAP of the diamond particles 20 satisfy the TD ratio of 0.6:1 to 2:1, such as from 0.9:1 to 2:1.

The TD ratio ranging from 0.6:1 to 2:1 provides that at least some of the diamond particles 20 may protrude from the top surface 11 of the coating matrix 10 by a first length L1 when the TD ratio of coating matrix thickness TCM to average particle size DAP of diamond particles 20 ranges from 0.6:1 to 0.99:1. According to some embodiments the first length L1 is a distance equal to about 1% to about 43% of the average coating matrix thickness TCM—including all integers therebetween.

In some embodiments, the coating matrix may further comprise other additives and fillers, such as a surfactant, as pigments, tackifiers, surfactant, fillers such as glass or polymeric bubbles or beads (which may be expanded or unexpanded), hydrophobic or hydrophilic silica, calcium carbonate, glass or synthetic fibers, blowing agents, toughening agents, reinforcing agents, fire retardants, antioxidants, and stabilizers. The additives are added in amounts sufficient to obtain the desired end properties. Suitable surfactants of the present invention include, but are not limited to, fluorinated alkyl esters, polyether modified polydimethylsiloxanes and fluorosurfactants, having the formula RfCH2CH2O (CH2CH2O)xH, wherein Rf=F(CF2CF2)y, x=0 to about 15, and y=1 to about 7. The surfactant may be present in the radiation curable adhesive composition by an amount ranging from about 0.5 wt. % to about 2 wt. %, preferably about 0.8 wt. %.

A wax power may be included to increase hydrophobicity of a coating surfaces. These may include fluoropolymers such as polytetrafluroethylene (PTFE).

In some non-limiting embodiments, the coating layer may be produced according to the following master batch methodology. The coating matrix is comprised of the binder, dispersing agent, photoinitiator, and flatting agent. The abrasion resistant particles comprise diamond particles. The components making up the binder are first combined and mixed together at room temperature with high speed agitation. For the purposes of the present application. the term high speed agitation means agitation with a blade at rotation speeds of at least 2,000 RPM. A dispersing agent may be added concurrently with the binder components or after the binder components have been blended together. The dispersing agents may be selected from acrylic block-copolymers, such as commercially available BYK Disperbyk 2008, Disperbyk 2155, Disperbyk 145 and Disperbyk 185, Lubrizol Solsperse 41000 and Solsperse 71000, and may be present in the coating layer by an amount ranging from 0.1 wt. % to 1 wt. %.

Next, the photoinitiator is slowly added at room temperature. In some alternative embodiments, the photoinitiator may be added at 45° C. with high speed agitation. Once the photoinitiator is entirely dissolved into the master batch mixture, flatting agents and the abrasion resistant particles may be added. The matting agent and abrasion resistant particles may be added to the master batch as the final ingredients to the blend of coating matrix and diamond particles. The matting agent and abrasion resistant particles should be added slowly to avoid a powder layer from forming and floating on top of coating matrix. Once added, the binder, dispersing agent, photoinitiator, matting agent, and abrasion resistant particles are mixed with high speed agitation for a period ranging from about 5 to about 15 minutes, preferably about 10 minutes. During the agitations, the blade may be moved up and down to ensure proper mixing of the ingredients in the master batch. The temperature of the master batch may increase during agitation, therefore to prevent premature thermal curing of the binder, the master batch may be cooled during agitation.

The fully blended coating matrix and diamond particles have a viscosity ranging from about 600 cPs to about 1300 cPs at room temperature (74° F.) as measured by a Brookfield Viscometer using spindle #6 at 100 RPM. In some embodiments of the present invention, the viscosity allows the blend of coating matrix and diamond particles to be applied to a substrate by roll coating at room temperature. The substrates may selected from linoleum tile, ceramic tile, natural wood planks, engineered wood planks, vinyl tile—such as luxury vinyl tile ("LVT"), and resilient sheet—such as homogenous or heterogeneous commercial resilient sheets and residential resilient sheets. After applying the blend of coating matrix and diamond particles to the substrate, the blend is exposed to UV radiation in air or a nitrogen environment.

The UV radiation includes UVA, UVB, UVC, and UVV sources. Non-limiting examples of UV partial cure radiation include UVA radiation of 0.189 J/cm2; UVB radiation of 0.163 J/cm2; UVC radiation of 0.01 J/cm2; and UVV radiation may be 0.092 J/cm2. The pre-cure temperature may be 30° C.-40° C. and the coating composition may be exposed to the UV radiation at a line speed ranging from about 25 to 75 FPM. Non-limiting examples of UV full cure include UVA radiation of 1.006 J/cm2; UVB radiation of 0.886 J/cm2; UVC radiation of 0.126 J/cm2; and UVV radiation may be 0.504 J/cm2. To fully cure, the coating composition may be exposed to the UV radiation at a line speed ranging from about 25 to 75 FPM. The fully cured coating matrix containing the diamond particles forms the coating layer of the floor covering.

As previously discussed, the UV curable coating matrix can be partially cured in some embodiments to prevent the abrasion resistant particles from fully settling within coating matrix. In some embodiments, the floor covering may contain two or three coating layers, each additional coating layer positioned on top of the previously applied coating layer. According to this embodiment, the additional coating layers may each be partially or fully cured before application of the subsequent coating layer to prevent the diamond particles of each coating layer from fully settling.

In some embodiments, the fully cured coating layer may have an average coating thickness that ranges from about 4 µm to about 40 µm. In some embodiments, the fully cured coating layer may have an average coating thickness that ranges from about 6 µm to about 20 µm. The specific thickness of the coating layer will depend on the average particle size of the abrasion resistant particles, as previously discussed.

According to the present invention, the TD ratio of average coating matrix thickness to average diamond particle size in combination with each low standard deviation in diamond particles sizes results in the coating layer having not only superior abrasion resistance but also superior retention on the surface finish of the coating layer, i.e. gloss. Specifically, there is little variation in the first length of the diamond particles that protrude from the top surface of the coating matrix. With such regularity, the amount of protrusion becomes much better controlled, thereby eliminating diamond particles that protrude too far from the coating matrix. With fewer diamond particles protruding too far from the coating matrix, there are less diamond particles that may be inadvertently dislodged from the coating matrix when a shear force (i.e. contact with a shoe) is applied to the coating layer during use, thereby limiting the likelihood that the abrasion resistance particles can be dislodged from the coating matrix, which would not only result in an uneven surface finish of the coating layer but the released abrasion resistant particles would being free to abrade the top surface of the coating matrix, thereby exacerbating the wear on the coating layer of the floor covering. The degree of premature abrasion resistant particle "pop-outs" would ultimately determine the wear rate of the coating layer, and, therefore, the floor covering. Abrasions resistant particles held firmly in place would create a more wear resistant floor covering than a floor covering where the abrasions resistant particles are popped out with relative ease and low shear force.

The features and advantages of the present invention are more fully shown by the following examples which are provided for purposes of illustration, and are not to be construed as limiting the invention in any way.

EXAMPLES

An example of an abrasion resistant coating may include the following:

|  | Approx. % by weight |
| --- | --- |
| Binder | 60-90 |
| Amine Synergist | 1-6 |
| Photoinitiator | 1-8 |
| Matting Agent | 1-6 |
| Dispersing Agent | 1-6 |
| Diamond | 3-5 |
| Total | 100 |

Minimal application of abrasion resistant coating (topcoat) was required to obtain superior resistance to loss of gloss caused by fine scratching. Subsequent applications of the coating system provided some additional performance enhancements, but a minimum application was all that was required to perform substantially better than competitive example. Specifically, a single layer of topcoat finish ranging from 1.1 to 1.6 g/SF provided and enhancement of from about 82-90% to about 95-99% Gloss retained, after a scrub test using 100 grit sandpaper weighted with 2.2 lbs, and employing about 30 cycles. This is a substantial improvement and is readily visible after inspecting the samples post test. In addition to this superior resistance to fine scratches, the products prepared also retained or improved other key performance attributes; including Taber Abrasion, household stain, chemical resistance, scuff resistance. The products with the improved finish system also had attractive visual attributes such as clarity, with added haze or surface texture. Based on other work performed using existing finish systems available commercially from Vendors such as PPG, AFI has demonstrated the ability to consistently generate Taber abrasion between the Commercial Grade and the Ultra High Taber Abrasion finishes. It is clear that the combination of the topcoat with the improved HAS of commercial vendors, will produce a finish system with both the improved Taber abrasion performance and the superior resistance to fine scratches in the scrub test. Furthermore, based upon the observation of the performance in Taber Abrasion in the Turlington system when the Topcoat was employed, it is also clear that addition of specified size, size distribution, concentration of diamond powder and within appropriate gauge layers, further enhancements in Taber abrasion cycles to failure will be observed.

Example 1: Suitable Coating Stacks

The following are examples of suitable coating stacks including the topcoat:

A) Scraped Hickory: open character. Dark coloration

TABLE 1.A

| Layer | Density | Coweight Applied (g/36 in$^2$) | Coweight Applied (g/ft$^2$) | ft$^2$/Gallon | Mil Applied |
|---|---|---|---|---|---|
| Stain | | | | 1050 | 1.527619 |
| High Abrasion | 11.9 | 0.4 | 1.6 | 3373.65 | 0.475449 |
| High Abrasion | 11.9 | 0.45 | 1.8 | 2998.8 | 0.534881 |
| Sanding Sealer | 10.27 | 0.25 | 1 | 4658.472 | 0.344319 |
| Sanding Sealer | 10.15 | 0.2 | 0.8 | 5755.05 | 0.278712 |
| Topcoat (w/w) | 10.26 | 0.38 | 1.52 | 3061.8 | 0.523875 |
| Total | | | | | 2.157 |

Figure 1:
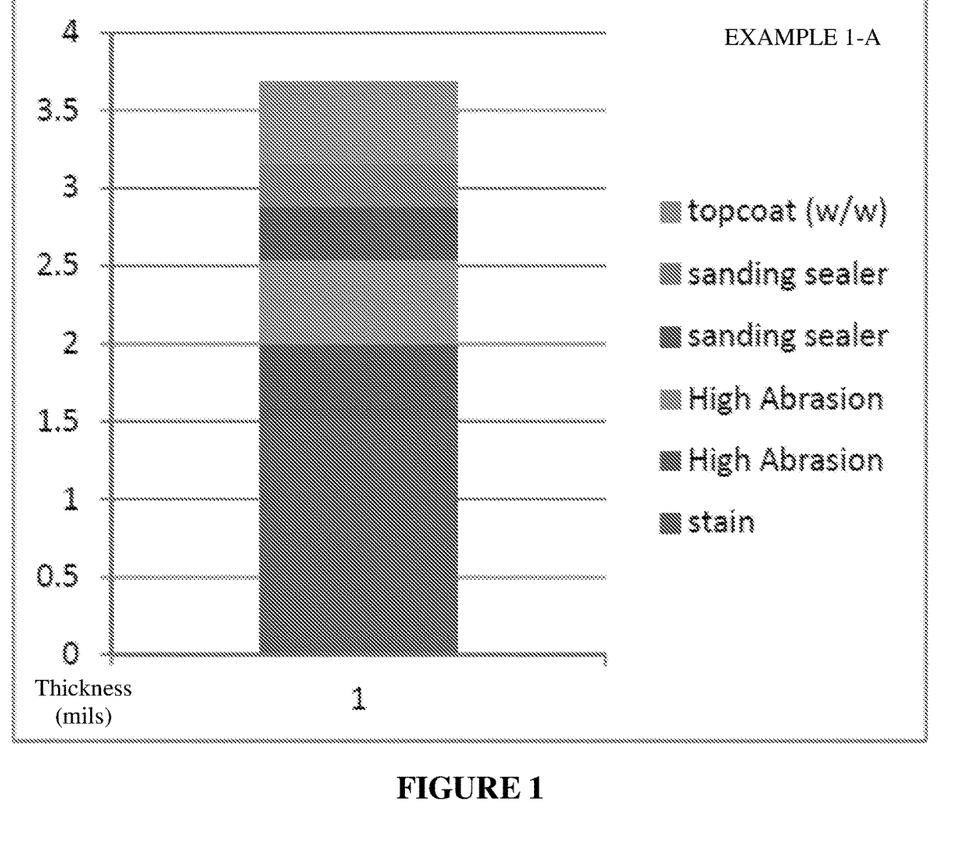
FIG. 1 is a chart showing the thickness (mils) for each layer of the topcoat in Example 1A.

The thickness (mils) for each layer of the topcoat in Example 1A is shown in the chart of FIG. 1.

B) Scraped Hickory: open character with anticheck primer. Dark coloration

TABLE 1.B

| Layer | Density | Coweight Applied (g/36 in$^2$) | Coweight Applied (g/ft$^2$) | ft$^2$/Gallon | Mil Applied |
|---|---|---|---|---|---|
| Stain | | | | 1050 | 1.527619 |
| High Abrasion | 11.9 | 0.4 | 1.6 | 3373.65 | 0.475449 |
| High Abrasion | 11.9 | 0.45 | 1.8 | 2998.8 | 0.534881 |
| Anticheck Primer | 8.87 | 0.34 | 1.36 | 2958.406 | 0.542184 |
| Sanding Sealer | 10.27 | 0.3 | 1.2 | 3882.06 | 0.413183 |
| Sanding Sealer | 10.15 | 0.2 | 0.8 | 5755.05 | 0.278712 |
| Topcoat (w/w) | 10.26 | 0.38 | 1.52 | 3061.8 | 0.523875 |
| Total | | | | | 2.768 |

Figure 2:
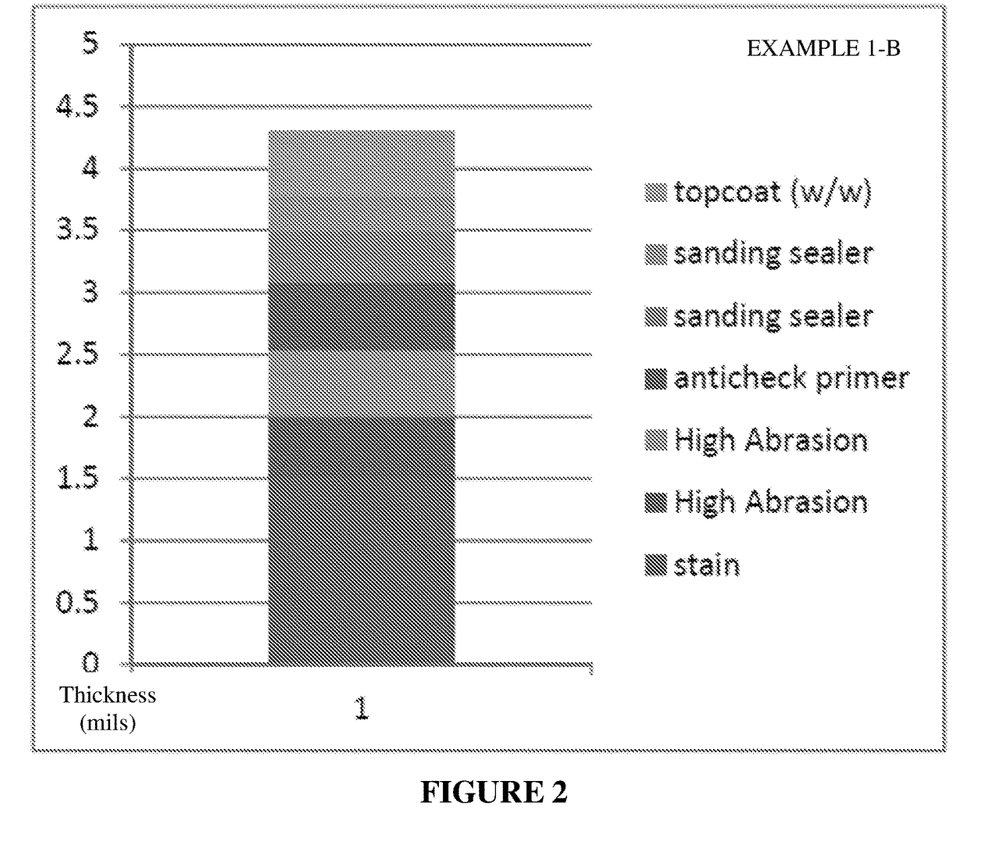
FIG. 2 is a chart showing the thickness (mils) for each layer of the topcoat in Example 1B.

The thickness (mils) for each layer of the topcoat in Example 1B is shown in the chart of FIG. 2.

C) Scraped Hickory: open character with anticheck primer. Light coloration.

TABLE 1.C

| Layer | Density | Coweight Applied (g/36 in$^2$) | Coweight Applied (g/ft$^2$) | ft$^2$/Gallon | Mil Applied |
|---|---|---|---|---|---|
| Stain | | | | 1050 | 1.527619 |
| High Abrasion | 11.9 | 0.4 | 1.6 | 3373.65 | 0.475449 |
| High Abrasion | 11.9 | 0.45 | 1.8 | 2998.8 | 0.534881 |
| Anticheck Primer | 8.87 | 0.34 | 1.36 | 2958.406 | 0.542184 |
| Sanding Sealer | 10.27 | 0.3 | 1.2 | 3882.06 | 0.413183 |
| Sanding Sealer | 10.15 | 0.2 | 0.8 | 5755.05 | 0.278712 |
| Topcoat (w/w) | 10.26 | 0.38 | 1.52 | 3061.8 | 0.523875 |
| Total | | | | | 2.768 |

Figure 3:
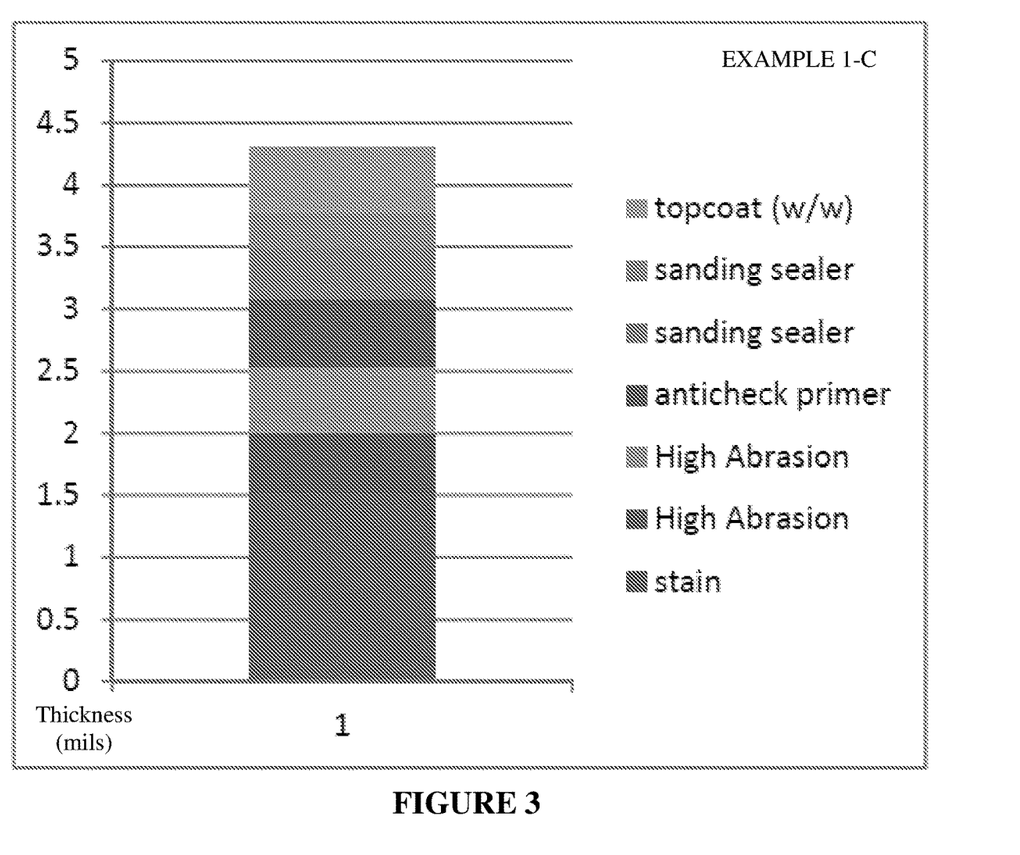
FIG. 3 is a chart showing the thickness (mils) for each layer of the topcoat in Example 1C.

The thickness (mils) for each layer of the topcoat in Example 1C is shown in the chart of FIG. 3.

D) Scraped Hickory: open character with no anticheck primer. Light coloration

TABLE 1.D

| Layer | Density | Coweight Applied (g/36 in$^2$) | Coweight Applied (g/ft$^2$) | ft$^2$/Gallon | Mil Applied |
|---|---|---|---|---|---|
| Stain | | | | 1050 | 1.527619 |
| High Abrasion | 11.9 | 0.4 | 1.6 | 3373.65 | 0.475449 |
| High Abrasion | 11.9 | 0.45 | 1.8 | 2998.8 | 0.534881 |
| Sanding Sealer | 10.27 | 0.25 | 1.2 | 3882.06 | 0.413183 |
| Sanding Sealer | 10.15 | 0.2 | 0.8 | 5755.05 | 0.278712 |
| Top Coat (w/w) | 10.26 | 0.38 | 1.52 | 3061.8 | 0.523875 |
| Total | | | | | 2.226 |

Figure 4:
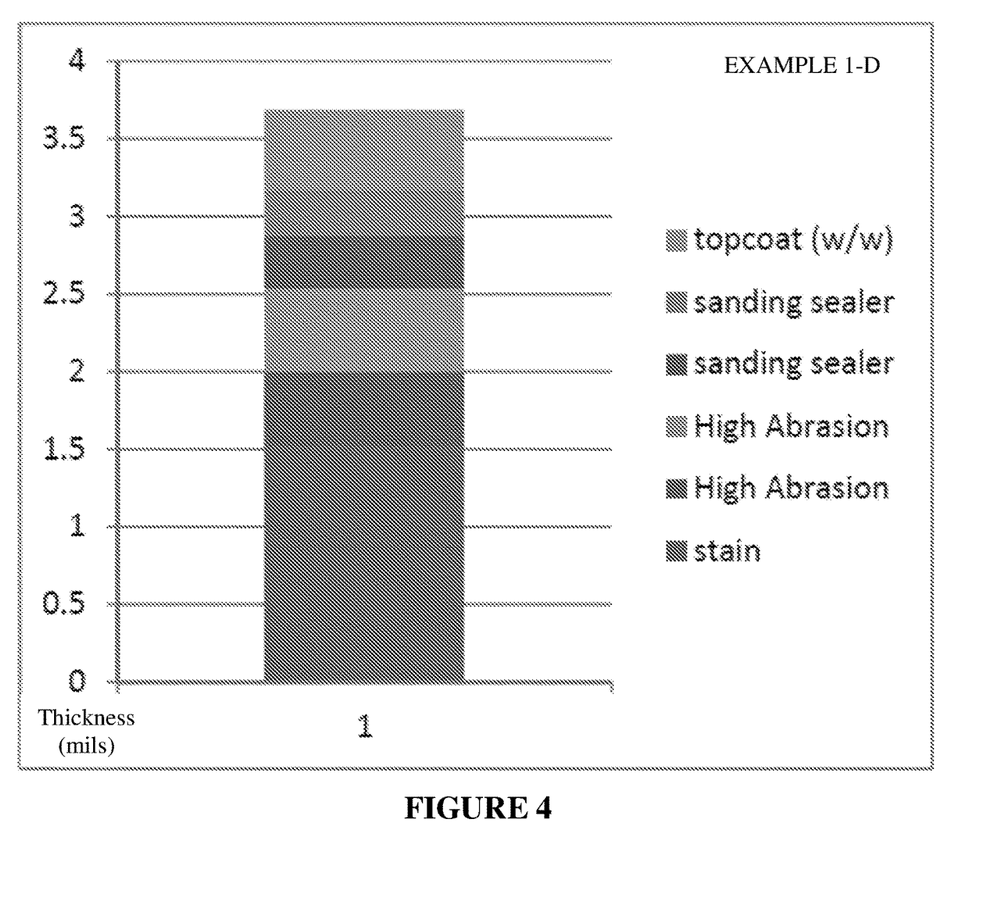
FIG. 4 is a chart showing the thickness (mils) for each layer of the topcoat in Example 1D.

The thickness (mils) for each layer of the topcoat in Example 1D is shown in the chart of FIG. 4.

E) Open Character with Saddle stain

TABLE 1.E

| Layer | Density | Coweight Applied (g/36 in$^2$) | Coweight Applied (g/ft$^2$) | ft$^2$/Gallon | Mil Applied |
|---|---|---|---|---|---|
| Stain | 9.5 | 0.35 | 1.4 | 3078 | 0.521118 |
| High Abrasion | 10.54 | 0.38 | 1.52 | 3145.358 | 0.509958 |
| High Abrasion | 10.54 | 0.36 | 1.44 | 3320.1 | 0.483118 |
| Sanding Sealer | 10.27 | 0.3 | 1.2 | 3882.06 | 0.413183 |
| Sanding Sealer | 10.15 | 0.19 | 0.76 | 6057.947 | 0.264776 |
| Top Coat (w/w) | 10.26 | 0.3 | 1.2 | 3878.28 | 0.413585 |
| Total | | | | | 2.085 |

Figure 5:
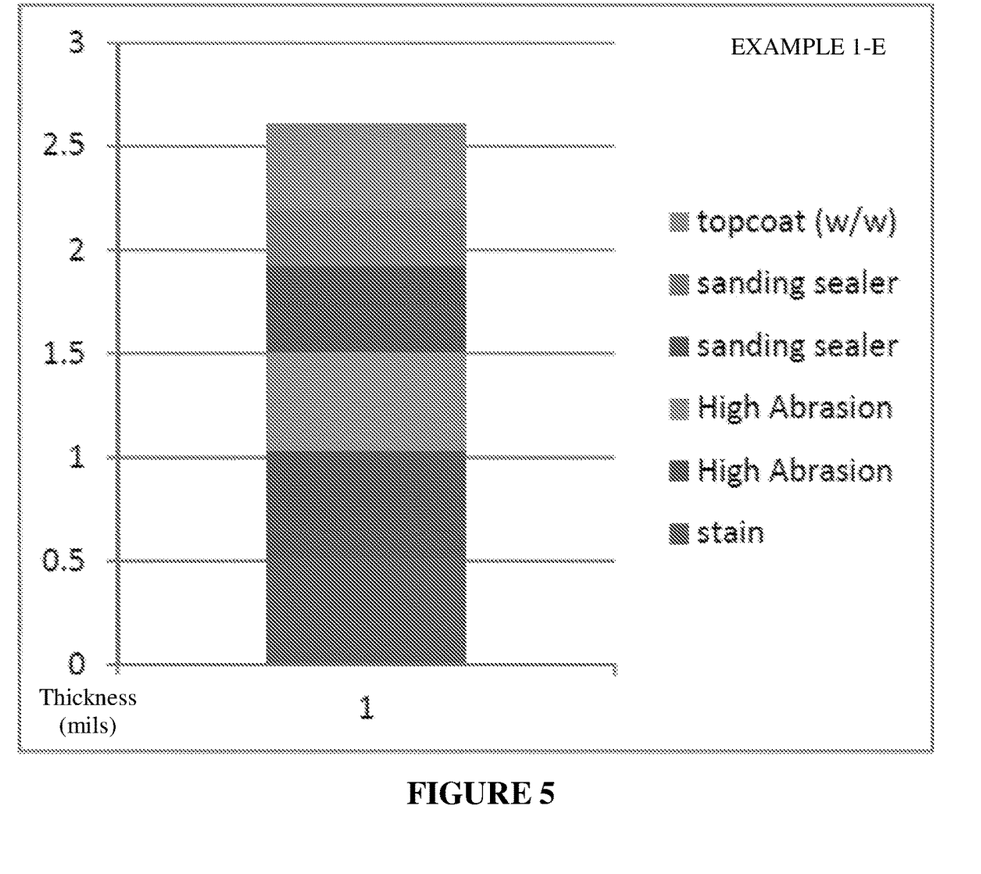
FIG. 5 is a chart showing the thickness (mils) for each layer of the topcoat in Example 1E.

The thickness (mils) for each layer of the topcoat in Example 1E is shown in the chart of FIG. 5.

F) Full Filled with Saddle stain

TABLE 1.F

| Layer | Density | Coweight Applied (g/36 in$^2$) | Coweight Applied (g/ft$^2$) | ft$^2$/Gallon | Mil Applied |
|---|---|---|---|---|---|
| Stain | 9.5 | 0.35 | 1.4 | 3078 | 0.521118 |
| Filler | 12.97 | 1.05 | 4.2 | 1400.76 | 1.145093 |
| Filler | 10.33 | 0.99 | 3.96 | 1183.255 | 1.355583 |
| High Abrasion | 11.9 | 0.78 | 3.12 | 1730.077 | 0.927126 |
| High Abrasion | 11.9 | 0.78 | 3.12 | 1730.077 | 0.927126 |
| Sanding Sealer | 10.27 | 0.17 | 0.68 | 6880.694 | 0.234137 |
| Sanding Sealer | 10.15 | 0.18 | 0.72 | 6394.5 | 0.250841 |
| Top Coat (w/w) | 10.26 | 0.32 | 1.28 | 3635.888 | 0.441158 |
| Total | | | | | 5.281 |

The filler application was mass at applicator roll without wiping. The final application is lower.

Figure 6:
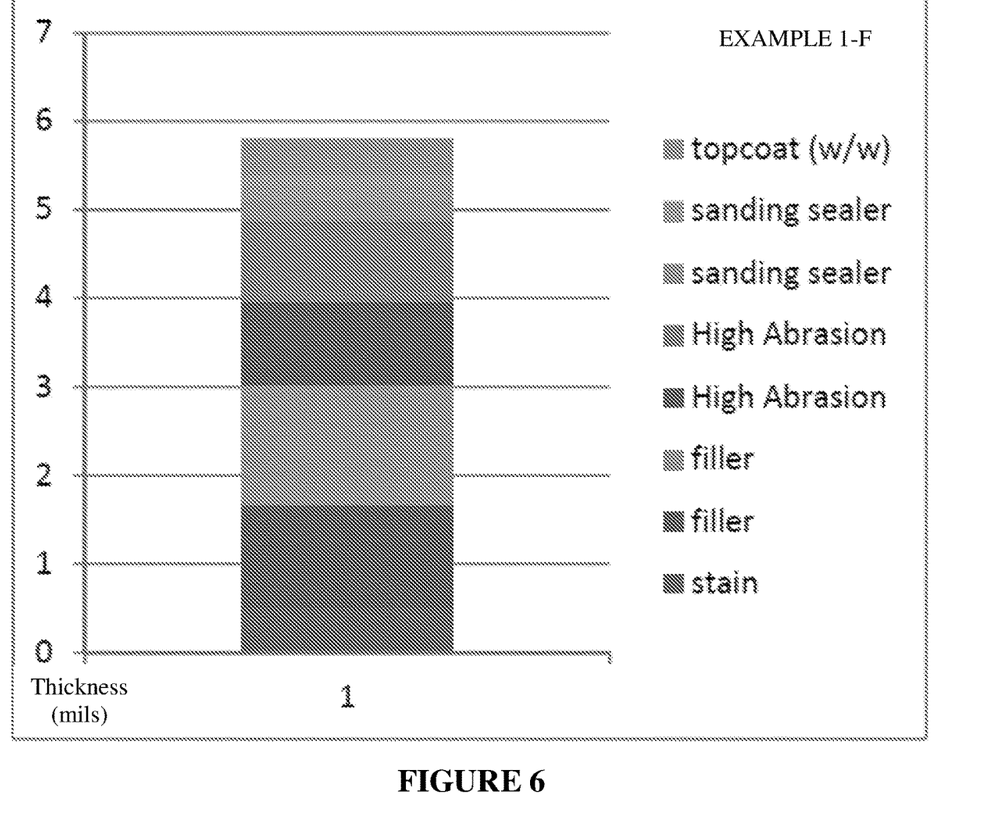
FIG. 6 is a chart showing the thickness (mils) for each layer of the topcoat in Example 1F.

The thickness (mils) for each layer of the topcoat in Example 1F is shown in the chart of FIG. 6.

Example 2: Abrasion Resistance Testing

A solid wood surface covering including an abrasion resistant coating of the present invention was tested against competitors' products to evaluate scratch resistance.

Procedure:

An industry leading test that simulates wear (BS EN 16094: Laminate Floor Coverings—Test Method for the determination of micro-scratch resistance), which uses a Martindale abrasion tester, was employed with the modifications discussed below.

Test method BS EN 16094:2012 calls for six samples with the dimensions of 150 μm×150 μm to be conditioned one week prior to testing at 23±2° C. and 50±5% relative humidity. For statistical purposes, twenty samples were tested as opposed to the six called out in the test method. The samples were not conditioned prior to testing. However, the samples were allowed to acclimate to the same temperature and humidity for 24 hours prior to testing.

The products used for testing are listed below in Table 2.1.

TABLE 2.1

Products Tested

| Brand | Product Line | Coating | Species | Color | Width (in.) |
|---|---|---|---|---|---|
| Armstrong (inventive) | Paragon ™ | Diamond 10 ® | Oak | Gunstock | 5 |
| Mohawk | Iron Gate | ArmorMax ™ | Oak | Chocolate | 5 |
| Shaw | Golden Opportunity | ScufResist ™ | Oal | Cocoa Bean | 3.25 |

The materials with a 5" width were cut to 5"×5" samples and the 3.25" wide material was cut to 6.5" and two pieces were glued together to get 6.5"×6.5" samples. All samples were marked on the surface using a square template to display where the center of the tester will abrade the surface. This was done to ensure that the measured and evaluation areas were consistent among samples.

The BS EN 16094:2012 test method describes two procedures that use different parameters and assessments (shown in Table 2.2).

TABLE 2.2

Test method parameters a defined in BS EN 16094: 2014.

| Test Parameter | Procedure A | Procedure B |
|---|---|---|
| Scrub Material | Very Fine (Scotch-Brite ™ 7447 pad) | Medium Fine (Scotch-Brite ™ 7440 pad) |
| Holder for Scrub Material | Version 2 (sample holder with large weight) = 1.25 pounds | Version 1 (sample holder with small weight) = 0.84 pounds |
| Speed Factor | 1 | 1 |
| Number of Rubs | 80 | 160 |
| Assessment | Gloss Change | Visual Assessment According to Annex B |

Preliminary testing performed using Armstrong and Mohawk samples and Procedures A and B (Table 2.2) failed to show a difference between the two products. Accordingly, modifications were applied to the test method in an attempt to differentiate the products' performance.

Initially, Procedure A was performed with the medium fine pad (instead of the very fine pad), but failed to show a significant difference. Using the medium fine pad in addition to increasing the number of rubs from 80 to 160 also failed to show a difference. These parameters represent the most aggressive conditions using combinations of the existing parameters called out in the method between Procedures A and B.

Accordingly, in order to create a more aggressive test, the Scotch-Brite™ pads were replaced with 3M aluminum oxide 100 grit sandpaper. The samples were tested using the sandpaper, with both versions of the holder at 80 scrubs. The small weight (Version 1) was sufficient in showing the difference in scratch resistance between the two products. While the large weight showed the difference, some light scratches were visible on the inventive sample. Thus, it was decided to proceed with testing using the parameters shown in Table 2.3.

TABLE 2.3

Modified test method used for evaluation of scratch resistance.

| Test Parameter | Procedure A |
|---|---|
| Scrub Material | 3M Aluminum Oxide 100 Grit Sandpaper |
| Holder for Scrub Material | Version 1 (sample holder with small weight) = 0.84 pounds |
| Speed Factor | 1 |
| Number of Rubs | 80 |
| Assessment | 1) Gloss Change & 2) Visual Assessment According to Annex B |

Due to the glued seam in the Shaw 6.5" wide samples the wear was uneven. A highpoint at the seam resulted in the rest of the sample being unevenly worn. To address this issue, the Shaw materials were rerun using 3.25"×6.25" samples to avoid a seam. These samples were centered on the tester such that the center of the pad remained on the sample at all times. Part of the pad did run over the edge of the sample while testing. However, the center lined up with the marks on the surface. This modification yielded more consistent wear. Some samples exhibited more wear near the sides of the sample, likely due to these boards having some cup across the width.

The gloss (60°) of each sample was measured by an average of four readings across the sample in the direction of the grain within the marked area. Initial readings were taken and recorded. After testing, each sample was cleaned with a dry rag to remove any dust build up and the final measurements were taken in the same manner as the initial. The results are shown in Table 2.4.

TABLE 2.4

Percent gloss retention data with calculated average and standard deviation.

| Inventive 20 Gloss | Inventive 55 Gloss | Mohawk | Shaw |
|---|---|---|---|
| 96.6 | 95.8 | 92.2 | 102.3 |
| 92.5 | 97.4 | 90.7 | 102.4 |
| 85.5 | 95.4 | 90.3 | 90.9 |
| 83.1 | 93.0 | 87.2 | 98.6 |
| 91.6 | 97.4 | 80.3 | 100.5 |
| 88.3 | 98.0 | 81.3 | 100.7 |
| 96.7 | 96.5 | 90.2 | 99.6 |
| 95.9 | 99.5 | 95.3 | 102.5 |
| 94.2 | 94.3 | 71.4 | 100.0 |
| 93.7 | 97.2 | 86.0 | 97.3 |
| 84.5 | 95.8 | 79.3 | 101.4 |
| 116.6 | 94.9 | 79.8 | 104.7 |
| 90.5 | 98.3 | 66.9 | 107.9 |
| 92.7 | 96.1 | 84.4 | 101.8 |
| 97.6 | 99.6 | 91.6 | 104.1 |
| 89.6 | 95.8 | 89.8 | 101.4 |
| 94.0 | 95.1 | 95.2 | 96.0 |
| 95.5 | 99.6 | 85.8 | 103.0 |
| 95.7 | 94.6 | 83.5 | 100.4 |
| 94.1 | 93.6 | 85.8 | 95.1 |

TABLE 2.4-continued

Percent gloss retention data with calculated average and standard deviation.

|  | Inventive 20 Gloss | Inventive 55 Gloss | Mohawk | Shaw |
|---|---|---|---|---|
| Average | 93.4 | 96.4 | 85.4 | 100.5 |
| Std. Dev. | 6.9 | 1.9 | 7.4 | 3.7 |

Visual ratings were determined using the criteria outlined in Annex B of the original method.

Results:

The gloss of the competitive materials did not exactly match those of the inventive product. The Mohawk product was measured to have an average of 60 gloss while the Shaw was measured to be about 43 gloss. These were compared with a 55 gloss inventive product.

Figure 7:
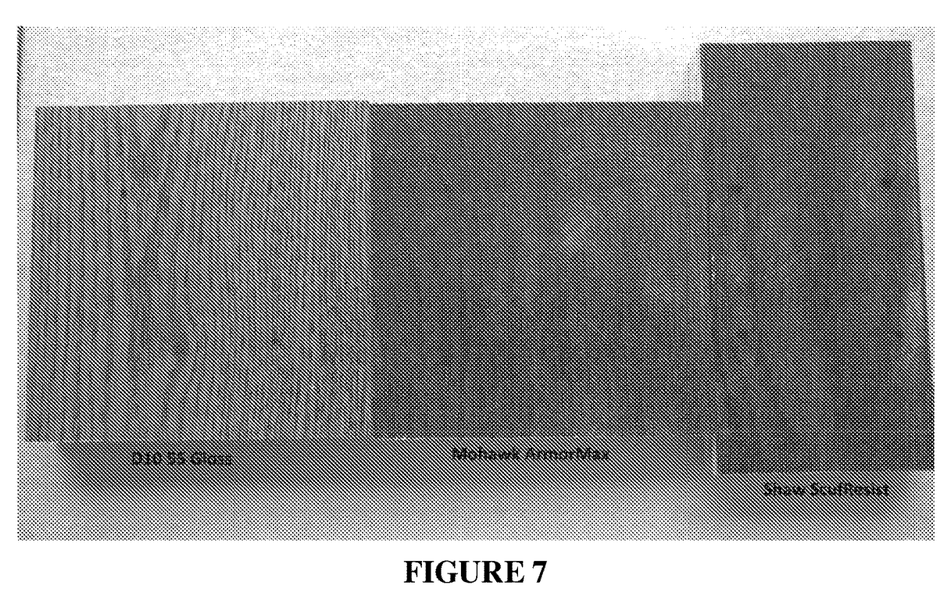
FIG. 7 is a photograph of samples of an inventive product (55 gloss), a Mohawk, and a Shaw product after abrasion testing as described in Example 2.

Although Shaw had higher percent gloss retention than inventive product, its visual assessments were rated lower. Scratches were more apparent on the Shaw product, as seen in FIG. 7, but those may not have been picked up by the gloss meter.

Figure 8:
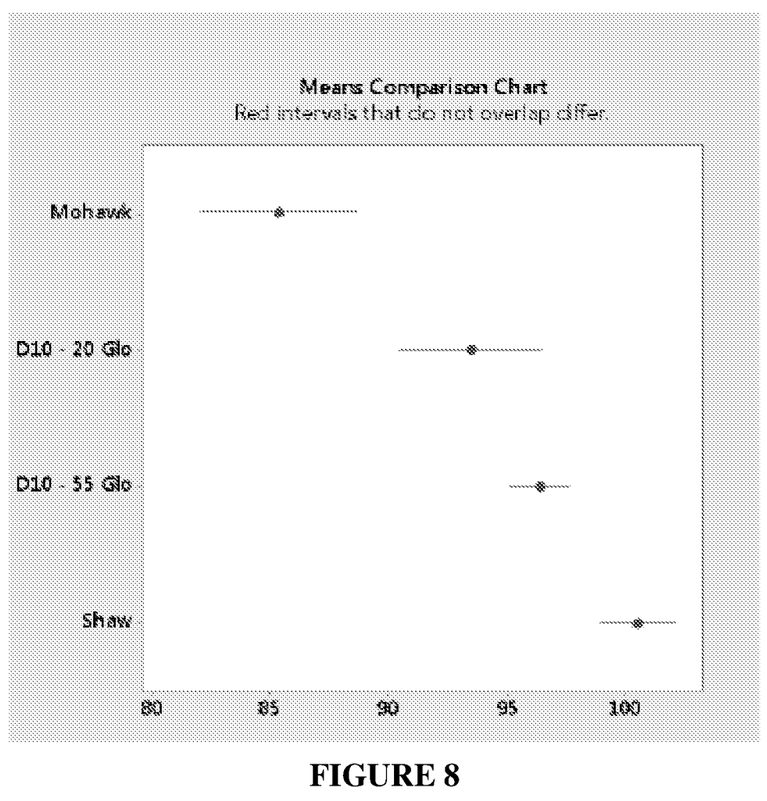
FIG. 8 is a chart showing means comparison for gloss retention for tested products after abrasion testing as described in Example 2.
Figure 9:
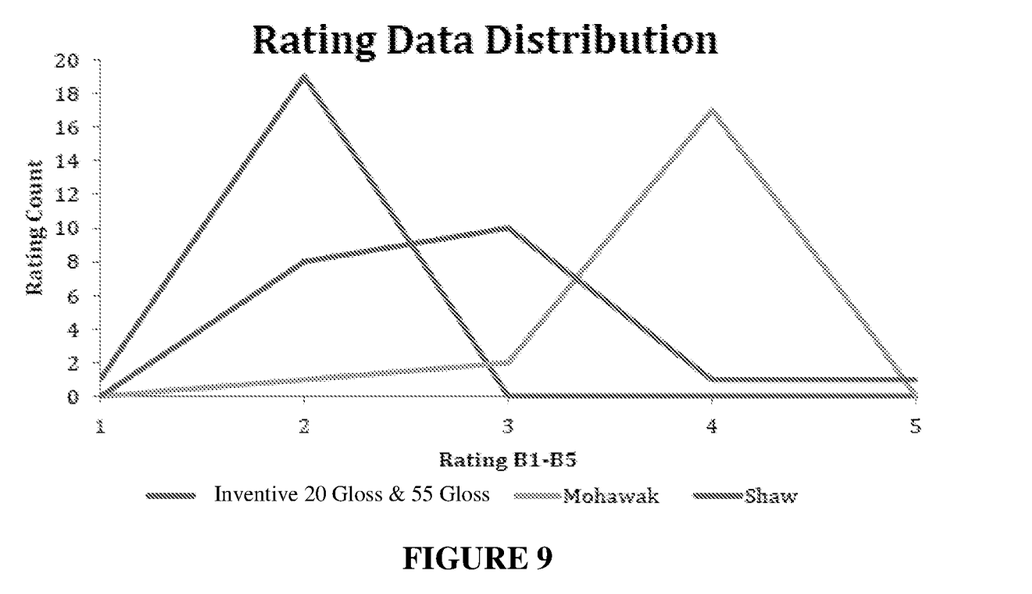
FIG. 9 is a chart showing visual assessment rating data distribution for tested products after abrasion testing as described in Example 2.

A One-Way analysis of variance (ANOVA) on percent gloss retention, shown in FIG. 8, demonstrates that, the inventive product's performance (55 gloss) statistically significantly differed from that of the two competitors' products. The Mohawk product performed worse while the Shaw performed better in regards to gloss retention. However, when assessing the visual scratch ratings as shown in FIG. 9, both inventive products (20 gloss and 55 gloss) demonstrated overall better ratings than the competitors' products.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

The invention claimed is:

1. A surface covering comprising:
(a) a wood substrate; and
(b) a coating stack, disposed on the wood substrate, comprising layers selected from the group consisting of:
(i) a primer layer;
(ii) one or more stain layers;
(iii) one or more filler layers;
(iv) one or more high abrasion sealer layers;
(v) an anti-check primer layer;
(vi) one or more sanding sealer layers;
(vii) one or more topcoat layers; and combination thereof;
wherein one or more of said layers includes abrasion resistant particles comprising diamond particles,
wherein the coating stack, when fully cured, forms a coating layer having an average coating thickness in the range of about 4 µm to about 40 µm,
wherein the diamond particles are sized to be within a standard deviation that is no more than 35% of an average particle size in the range of about 6 µm to about 25 µm, and
wherein the average coating thickness forms a ratio to the average particle size in the range of 0.6:1 to 2:1.

2. The surface covering of claim 1, wherein said wood substrate is solid hardwood or engineered hardwood.

3. The surface covering of claim 1, wherein said abrasion resistant particles are included in one or more of the layers selected from the group consisting of said one or more high abrasion sealer layers, said one or more sanding sealer layers, said one or more topcoat layers, and combinations thereof.

4. The surface covering of claim 1, wherein said one or more topcoat layers includes a binder comprising a resin derived from an acrylate-functional monomer.

5. The surface covering of claim 1, wherein said one or more topcoat layers includes a binder comprising a combinations of resins derived from different acrylate-functional monomers.

6. The surface covering of claim 1, wherein the average particle size is in the range of about 6 µm to about 11 µm.

7. The surface covering of claim 1, wherein the average particle size is in the range of about 6 µm to about 10 µm.

8. The surface covering of claim 1, wherein the standard deviation is less than 25% of the average particle size.

9. The surface covering of claim 8, wherein the standard deviation is less than 15% of the average particle size.

10. The surface covering of claim 1, wherein the ratio is in the range of 0.6:1 to 0.99:1.

* * * * *